(12) United States Patent
Ishiyama

(10) Patent No.: US 6,237,547 B1
(45) Date of Patent: May 29, 2001

(54) ENGINE COOLING ARRANGEMENT

(75) Inventor: Hideyuki Ishiyama, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/390,950

(22) Filed: Sep. 7, 1999

(30) Foreign Application Priority Data

Sep. 10, 1998 (JP) .................................................. 10-256830
Sep. 10, 1998 (JP) .................................................. 10-256865

(51) Int. Cl.[7] ...................................................... F01P 1/06
(52) U.S. Cl. .................................... 123/41.31; 123/568.12
(58) Field of Search ............................ 123/568.12, 41.31, 123/41.29

(56) References Cited

U.S. PATENT DOCUMENTS

| 5,115,789 | 5/1992 | Aoyama . |
| 5,609,143 | 3/1997 | Schellenberg et al. . |
| 5,690,082 | 11/1997 | Tanioka et al. . |
| 5,690,087 | * 11/1997 | Tanioka et al. ................. 123/568.12 |
| 5,899,181 | * 5/1999 | Kusata et al. ..................... 123/90.31 |

FOREIGN PATENT DOCUMENTS

| 0814246 | 12/1997 | (EP) . |
| 09264153 | 10/1997 | (JP) . |
| 10-2256 | * 1/1998 | (JP) . |
| 10054254 | 2/1998 | (JP) . |

* cited by examiner

Primary Examiner—Noah P. Kamen
(74) Attorney, Agent, or Firm—Ernest A. Beutler

(57) ABSTRACT

Two embodiments of water cooled internal combustion engines employing an EGR system. The embodiments also utilize direct cylinder injection. The EGR system is formed integrally within a housing assembly that also forms a portion of the cooling system for the engine and particularly a return coolant manifold. In this way, the exhaust gas recirculation valve can be cooled and its life and performance improved. In addition, this reduces the amount of heat added to the intake system and thus improves the volumetric efficiency of the engine.

14 Claims, 9 Drawing Sheets

US 6,237,547 B1

ENGINE COOLING ARRANGEMENT

BACKGROUND OF THE INVENTION

This invention relates to an internal combustion engine and more particularly to an engine cooling arrangement and a cooling arrangement that assist in cooling the EGR system of the engine.

As is well known, engines frequently embody an exhaust gas recirculation system (EGR) that is utilized to control the amount of nitrous oxides in the exhaust. By circulating a portion of the exhaust gases back into the combustion chambers, the combustion temperature can be lowered and nitrous oxide emissions reduced and/or controlled.

Normally the amount of exhaust gas recirculation is controlled by means of a valve in a conduit that extends from the exhaust system of the engine to the induction system. These valves are frequently reciprocating type valves having sealing surfaces that are brought into and out of engagement by a control element so as to control the amount of exhaust gases recirculated for a given engine running condition.

Obviously, the valve and its mounting body experiences a substantial amount of heat due to the fact that the exhaust gases are quite highly heated. This heat can deteriorate the operation of the EGR valve and also can generate excess heat in the engine. Furthermore, the introduction of hot exhaust gases into the intake system can raise the temperature of the air inducted and thus reduce the volumetric efficiency of the engine.

It is, therefore, a principal object of this invention to provide an improved and simplified arrangement for cooling an engine and more particularly cooling the EGR valve of engine.

It is a further object of this invention to provide a simple low cost and highly effective arrangement for cooling the exhaust gas recirculation valve of an engine without requiring extra components at the same time simplifying the overall engine construction.

SUMMARY OF THE INVENTION

This invention is adapted to be embodied in an internal combustion engine having a water cooled engine body, an exhaust manifold for collecting exhaust gases from the engine body and discharging them to the atmosphere through an exhaust system and an induction system for inducting air into the engine body for mixture with fuel and combustion therein. The engine body cooling jacket includes an external conduit which is formed in a unit with an exhaust gas recirculation valve so that the engine coolant will cool the exhaust gas recirculation valve.

DETAILED DESCRIPTION OF THE PREFERRED EMBODIMENTS

Figure 1:
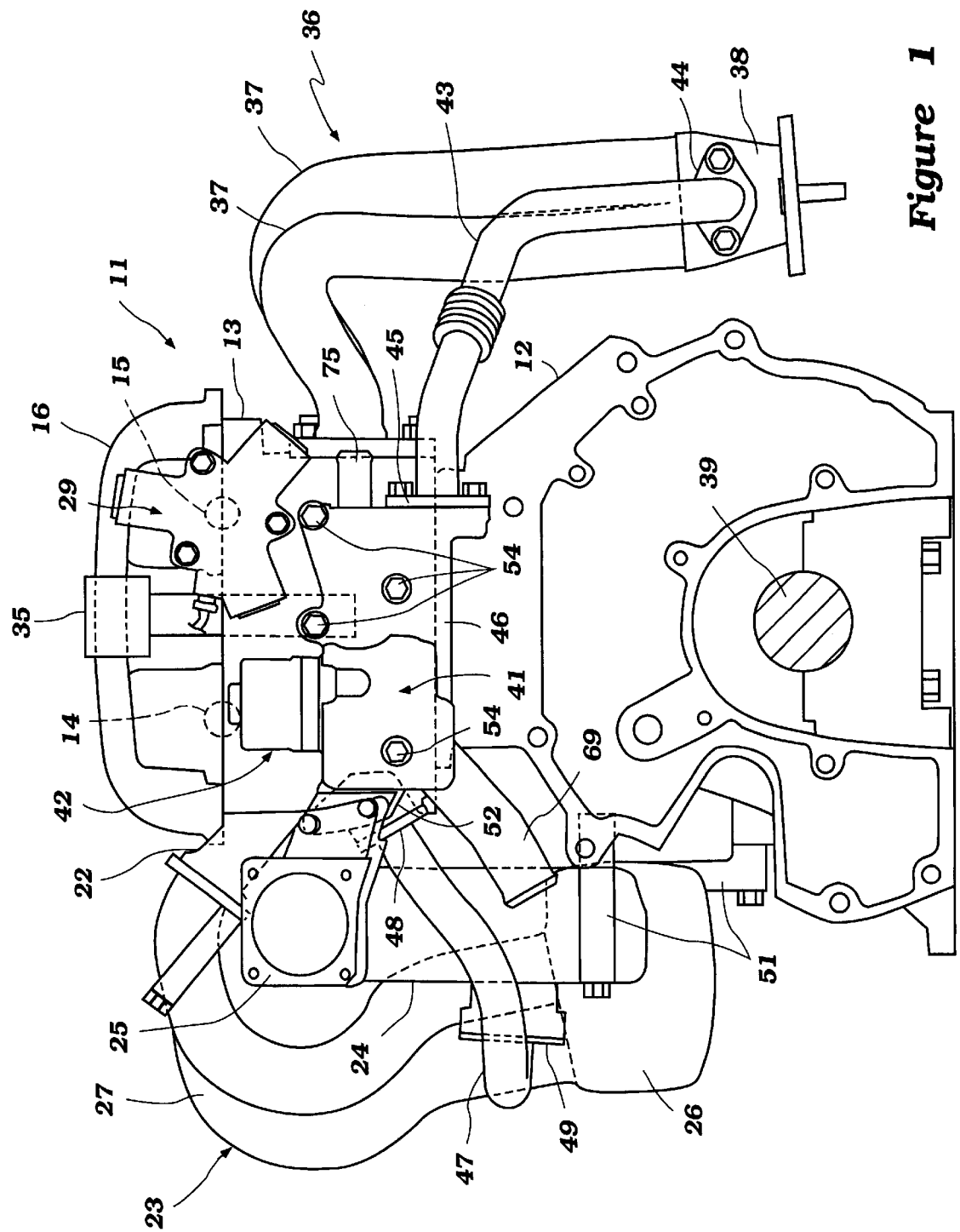
FIG. 1 is an end elevational view of an internal combustion engine constructed in accordance with a first embodiment of the invention.

Referring now in detail to the drawings and initially primarily to FIGS. 1–4, an internal combustion engine constructed and operated in accordance with a first embodiment of the invention is indicated by the reference numeral 11. In the illustrated embodiment, the engine 11 is of the four cylinder inline type and is of a type frequently used for automotive applications. It will be apparent, however, to those skilled in the art how the invention can be utilized with a wide variety of engines of other types and other cylinder numbers and configurations and utilized in other than automotive applications.

The engine 11 is comprised of a cylinder block crankcase assembly, indicated generally by the reference numeral 12, in which four inline cylinder bores are formed. Since the internal structure of the engine 11 forms no part of the invention, the interior of the engine is not illustrated as it is believed those skilled in the art will readily understand how the invention is practiced with engines of varying types.

Figure 3:
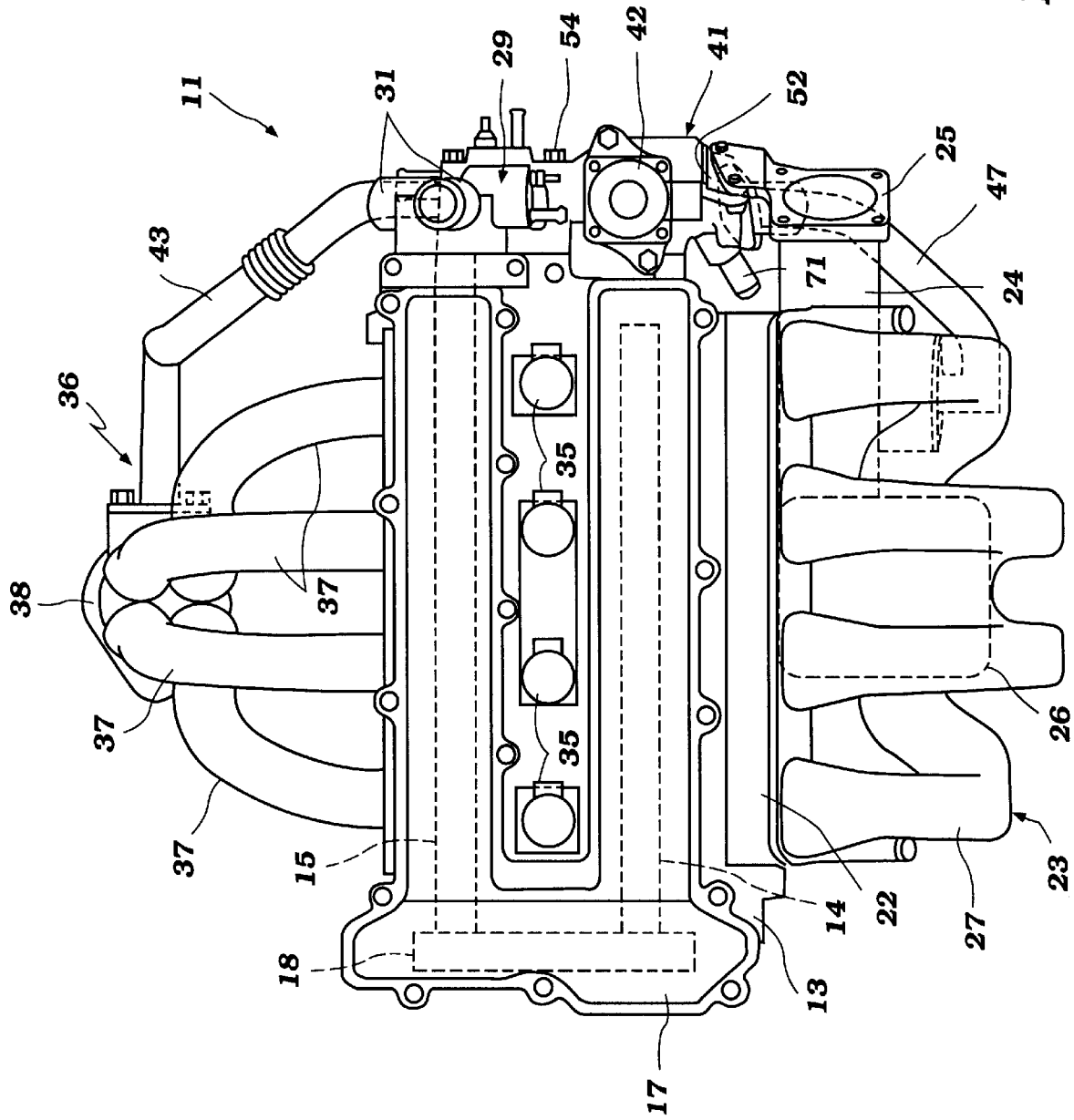
FIG. 3 is a top plan view of the engine.

A cylinder head assembly 13 is affixed to the cylinder block crankcase assembly 12 and contains at its upper end a pair of overhead cam shafts, which appear in phantom lines in FIG. 3 and are identified by the reference numerals 14 and 15. These cam shafts 14 and 15 comprise intake and exhaust cam shafts, respectively, and are contained within a cam chamber formed in the upper part of the cylinder head assembly 13. This cam chamber is closed by a cam cover 16.

The cam cover 16 also covers, in part, a timing case 17 formed at one end of the engine in which a timing drive 18 is provided for driving the cam shafts 14 and 15 at one-half crankshaft speed, as is well known in this art.

Figure 4:
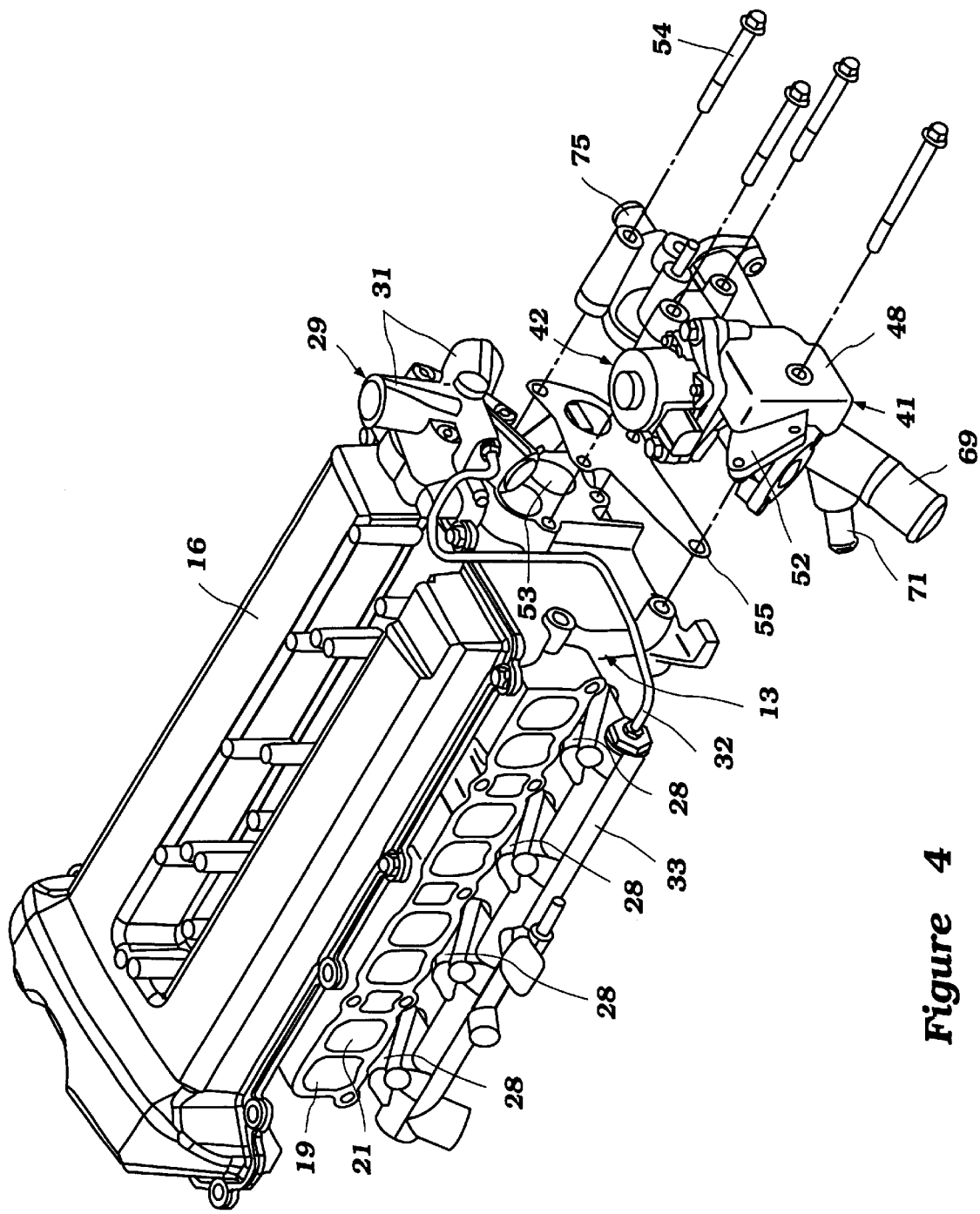
FIG. 4 is a partially exploded view of the engine looking from the front as shown in FIG. 1 and from the side shown in FIG. 2 (intake side).

As best seen in FIG. 4, the intake side of the cylinder head 13 is formed with a plurality of intake ports comprised of two ports for each cylinder. These are comprised of a primary port 19 and a secondary port 21 for each cylinder.

A control valve assembly, which is not shown in FIG. 4 but which does appear in the other figures and which is indicated by the reference numeral 22, is fixed to this side of the cylinder head 13. The control valve assembly 22 includes control valves for controlling the flow through the secondary ports 21 so that these ports will serve the combustion chambers of the engine primarily under high speed high load conditions. Any suitable control strategy, however, may be employed.

An induction system, indicated generally by the reference numeral 23 is provided for supplying a source of atmospheric air to these intake ports 19 and 21 through the control valve assembly 22. The induction system 23 includes an air inlet conduit 24 which extends to the end of the engine opposite of that timing drive 18. This conduit 24 has a flanged end 25 for connection to a throttle body assembly and air intake silencing and filtering system none of which are shown.

The air which flows into the intake pipe 24 passes through a plenum section 26 from which servers individual runners 27 extend to the individual cylinders and specifically the primary and secondary ports 19 and 21 thereof.

In the illustrated embodiment, the engine 11 is of the direct injected type. To this end, fuel injectors 28 are mounted in the cylinder head assembly 13 in a position juxtaposed to and below the intake ports 19 and 21 of each cylinder. These fuel injectors 28 may be of any known type and are supplied with high pressure fuel from an exhaust cam shaft driven high pressure mechanical fuel pump 29. The fuel pump 29 has pumping cylinders 31 and delivers the high pressure fuel to a supply line 32 which extends across this end of the engine. There, the supply line 32 meets a fuel rail 33 which is associated with the injectors 28 in a known manner for the supply of high pressure fuel thereto.

Figure 2:
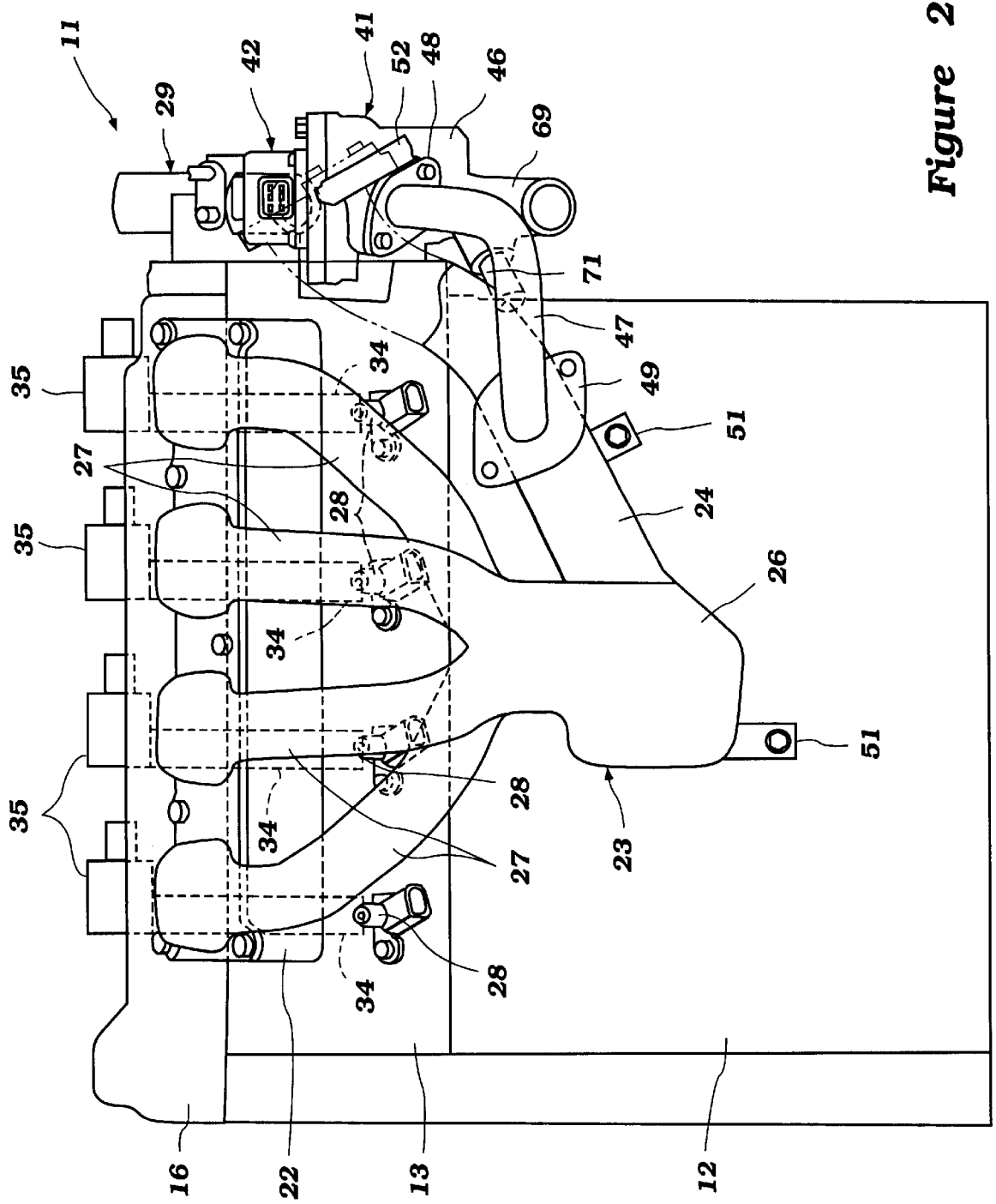
FIG. 2 is a side elevational view of the engine showing the induction side thereof.

Spark plugs 34 which are shown only in phantom in FIGS. 1 and 2 are mounted in the cylinder head assembly 13 for firing the fuel air charge formed therein. These spark plugs 34 are fired by combined coil and spark controllers 35 mounted on the terminal tips thereof. These coil assemblies 35 are triggered by a suitable ignition circuit mounted at an appropriate location on the engine.

Figure 5:
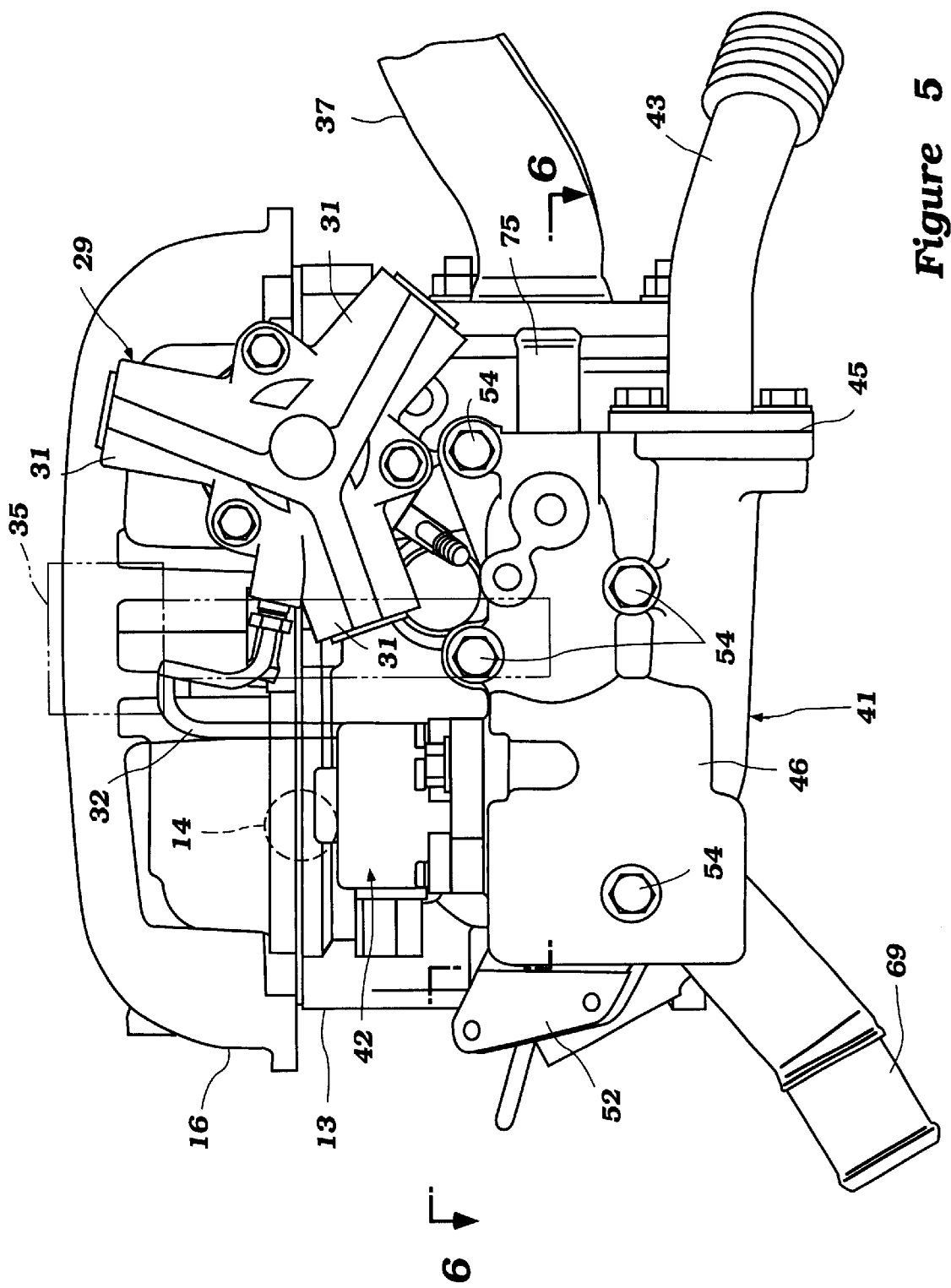
FIG. 5 is a view looking in the same direction as FIG. 1 but is enlarged and shows only the upper portion of this end of the engine.
Figure 6:
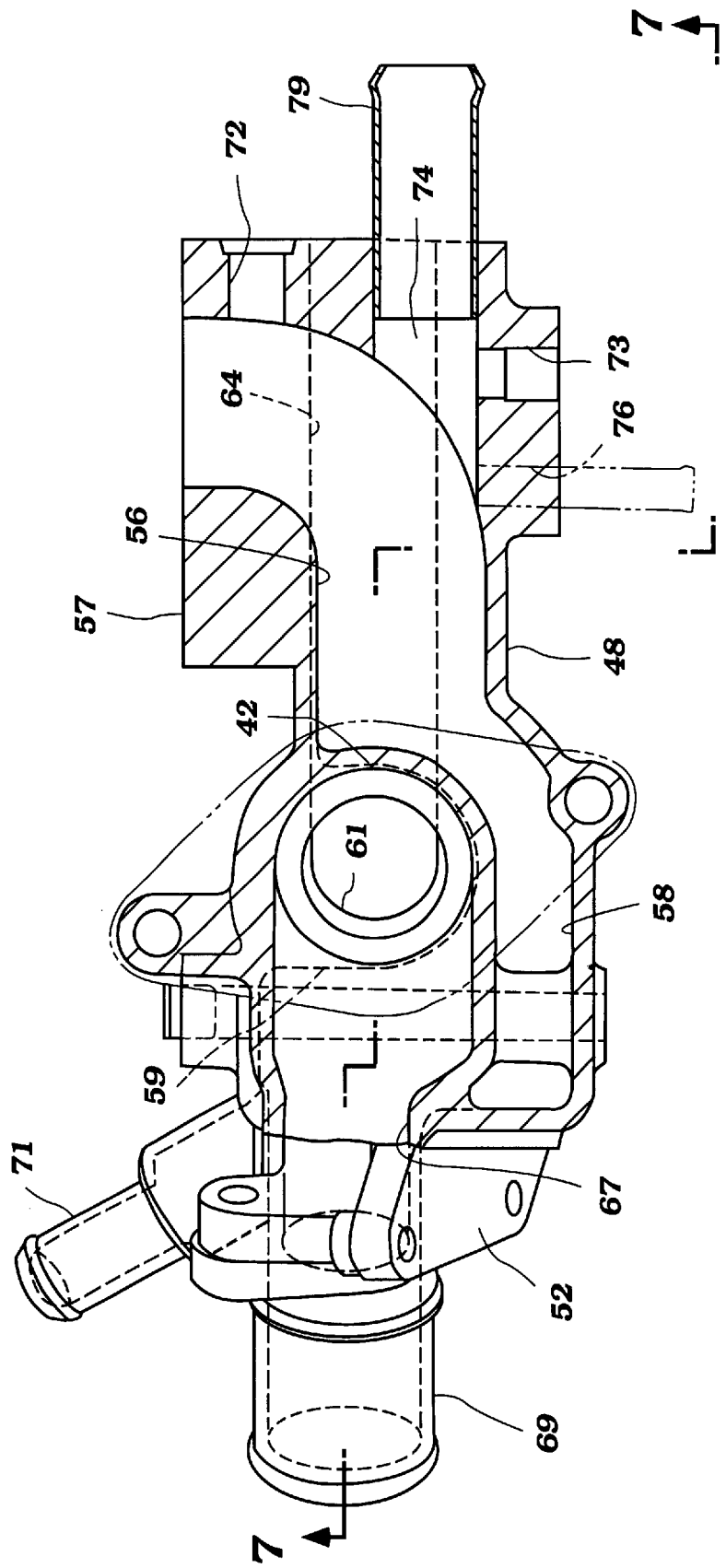
FIG. 6 is an enlarged cross-sectional view taken along the line 6—6 of FIG. 5 and shows the EGR valve body and associated cooling arrangement.

An exhaust manifold, indicated generally by the reference numeral 36 (FIGS. 1, 3 and 5) is affixed to the side of the cylinder head assembly 13 opposite to the intake manifold 23. This exhaust manifold 36 includes a plurality of runner sections 37, each of which communicates with a respective exhaust port on this side of the cylinder head 13. These exhaust manifold runners 37 communicate with a collector section 38 that is formed at a lower portion of the exhaust side of the engine 11. This collector section 38 communicates with a suitable exhaust system (not shown) for discharge of the exhaust gases to the atmosphere.

Although the internal construction of the engine is not necessary to understand the construction or operation of the invention, it will be seen in FIG. 1 that the crankshaft 39 driven by the pistons and the cylinders of the cylinder block 12 extends through this end of the engine for coupling to a suitable transmission.

The invention deals primarily with a combined EGR valve and coolant return arrangement, indicated generally by the reference numeral 41, which is preferably located at this end of the engine. The internal structure of this unit 41 will be described in more detail shortly by reference primarily to FIGS. 6–9. However, its connections to the engine will be described primarily by reference to FIGS. 1–5.

The assembly 41 includes a solenoid operator 42 that operates the EGR valve, to be described shortly, in accordance with a desired control strategy. The EGR valve collects exhaust gases from the manifold collector section 38 through an exhaust gas recirculation inlet line 43 which has a flange 44 at its inlet end that is affixed to the exhaust manifold collector section 38. A delivery flange 45 at the other end of this conduit 43 is affixed to a body 46 control valve body 41 in a manner which will be described shortly so that the exhaust gases are delivered thereto.

Under the control of the EGR valve solenoid 42, these exhaust gases are delivered to an EGR delivery tube 47 which has a flange 48 at its inlet end that is affixed to the body 46 of the assembly 41. A flange 49 at the other end thereof is affixed to the induction system inlet pipe 24 as best seen in FIG. 2.

The connecting flange 49 is juxtaposed to a mounting bracket assembly 51 which serves the purpose of fixing the induction system 23 to the intake side of the cylinder block assembly 12. In addition, a further mounting bracket 52 connects the upper end of the inlet pipe 24 to the cylinder head 13.

By delivering the exhaust gases to the inlet pipe 24, they will be well mixed with the intake air with this mixing continuing the plenum chamber 26 and runner sections 27 so as to provide the desired degree of exhaust gas recirculation in well mixed quantities.

Obviously since the exhaust gases are quite hot, this presents a significant heat problem which is solved by the construction of the assembly 41 which will now be described by reference to the remaining and aforenoted mentioned figures.

The engine 11 is, as has been noted, of the liquid cool type. Basically the liquid system may be of any known construction but, in accordance with a feature of the invention, the cylinder head assembly 13 is provided with a coolant outlet 53 that is formed in the end thereof adjacent where the high pressure fuel pump 29 is located and driven.

Coolant from this coolant outlet opening 53 is delivered to the housing 46 which is fixed in mating relationship thereto by a plurality of threaded fasteners 54. A sealing gasket 55 is interposed between the housing assembly 41 and the cylinder head 13 for water sealing purposes.

Referring now to primarily to FIGS. 6–9, the housing assembly 46 has formed therein a coolant inlet passage 56 which opens through the face 57 aforementioned that is held in abutting relationship with the gasket 55 and in communication with the cylinder head coolant outlet opening 53. This coolant inlet passage 56 is positioned rather high in the body 46.

This passage 56 merges into a circular coolant chamber portion 58 which is defined by an inner wall 59 of the housing 48 in which a cylindrical EGR chamber 61 containing an EGR valve body 65 is formed. A valve seat 62 extends in this valve body 65 across this chamber and has an opening that is valved by a poppet type valve 63 which is actuated by the aforenoted solenoid motor 42.

Figure 7:
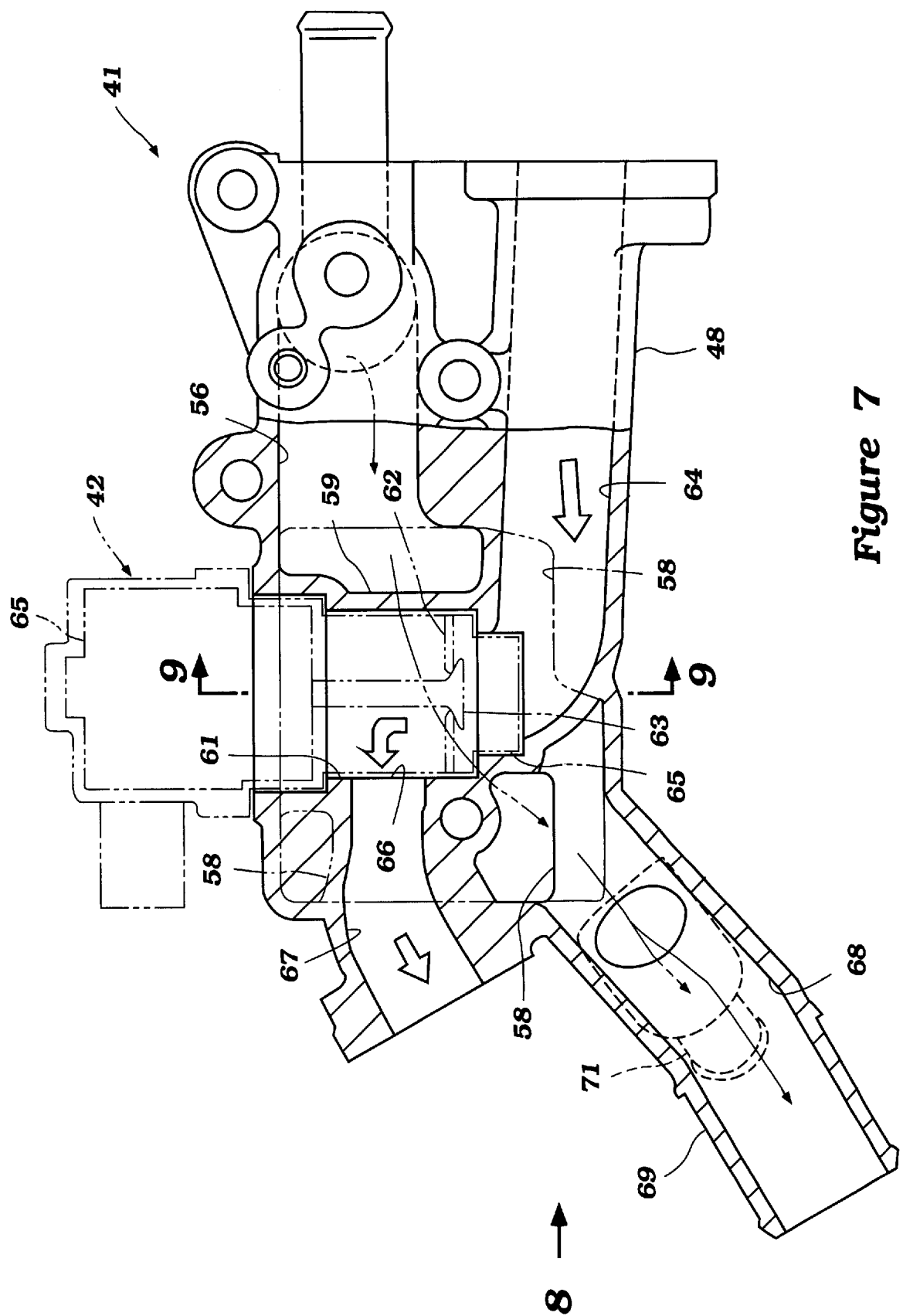
FIG. 7 is a cross-sectional view taken along the line 7—7 of FIG. 6.
Figure 8:
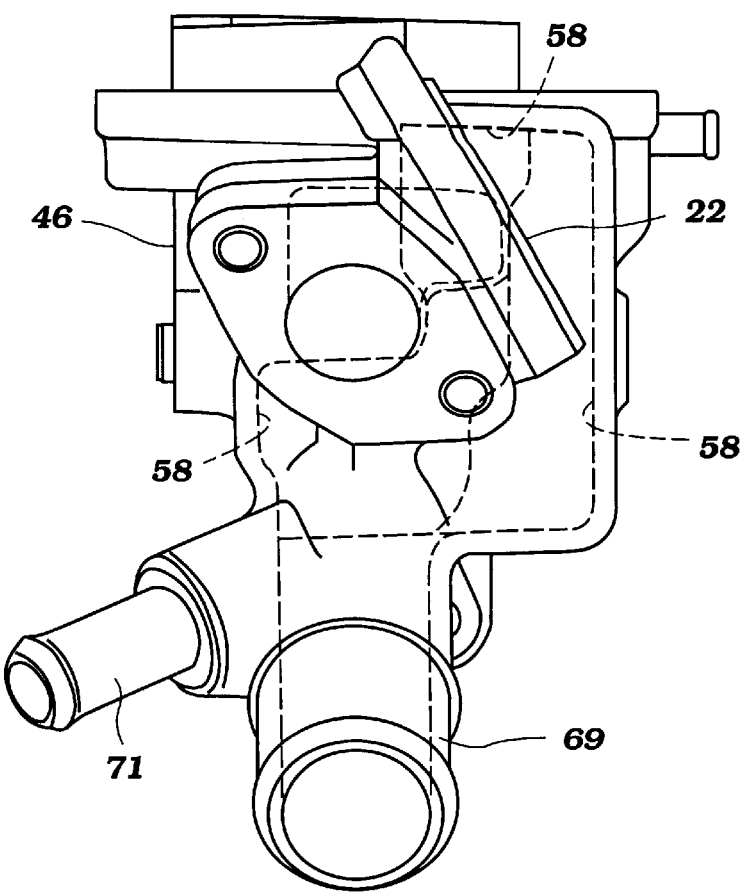
FIG. 8 is a side view of the valve assembly looking in the direction of the arrow 8 in FIG. 7.
Figure 9:
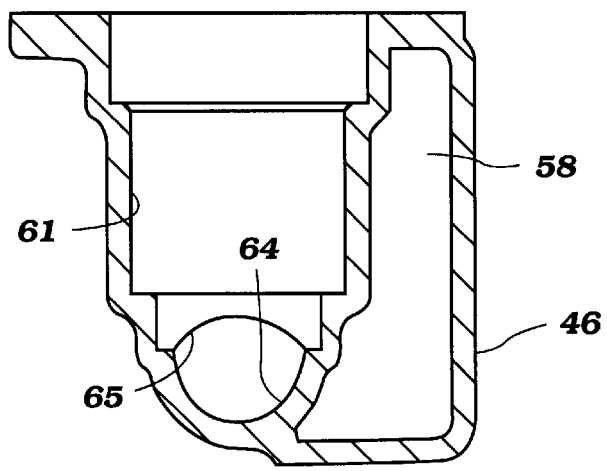
FIG. 9 is a cross-sectional view taken along the line 9—9 of FIG. 7.

As may be best seen in FIG. 7, the exhaust gas recirculation pipe 43 is connected to mate with an exhaust gas inlet passage 64 which is formed in the lower portion of the housing 48 beneath the water inlet 56. This passageway 64 extends to communicate with an inlet opening formed in the valve body 65 that contains the valve seat 62 and the valve 63. This valve body 65 has an outlet opening 66 which communicates with a exhaust gas delivery passage 67 in the housing 48. This passage 67 receives the flange 47 of the exhaust gas delivery pipe 46.

At the lower end of the cooling chamber 58, which, as should be apparent from the foregoing description, encircles the valve body 65 and hence, will cool it and the valve element 62 and 63 contained therein. The chamber 58 then discharges through a coolant discharge passageway 68 formed in an extending nipple portion 69 of this housing 48.

The nipple portion 69 receives a coolant return tube (not shown) for returning the coolant to a heat exchanger such as a radiator. Thus, the exhaust heat is not delivered to the coolant before it has an opportunity to cool the main engine body. However, even the heated coolant from the engine cooling jacket will be considerably cooler than the exhaust gases and hence, significant cooling of the EGR valve body 65 and its components can be obtained because of the proximity of the coolant passages to it. The large contact area provided by the described flow path also aids in this cooling.

A heater hose nipple 71 may also be formed in the nipple 69 for connection to the air conditioning system of the associated vehicle if desired.

In the figures the phantom arrows show the flow of liquid coolant while the open white arrows show the flow of exhaust gases. Thus, it should be readily apparent that this construction provides a very effective yet simple way of cooling the exhaust gas recirculation valve and also provides some cooling for the exhaust gases before they are mixed with the inducted air so as to reduce the heating thereof and the resulting loss of volumetric efficiency.

The housing 46 of the unit 41 also is provided with a pair of sensor receiving openings 72 and 73. These openings receive sensors for sensing the engine coolant temperature and the exhaust gas temperature, respectively. It also should be noted that other coolant may be introduced into the device 41 via a further coolant receiving opening 74 having a nipple 75 for receiving a hose. This may be return hose from the heater or from some other system in the engine.

The housing assembly 48 may also be provided with an air bleed, shown in phantom at 76 so as to permit bleeding of air from the coolant system if desired.

Figure 10:
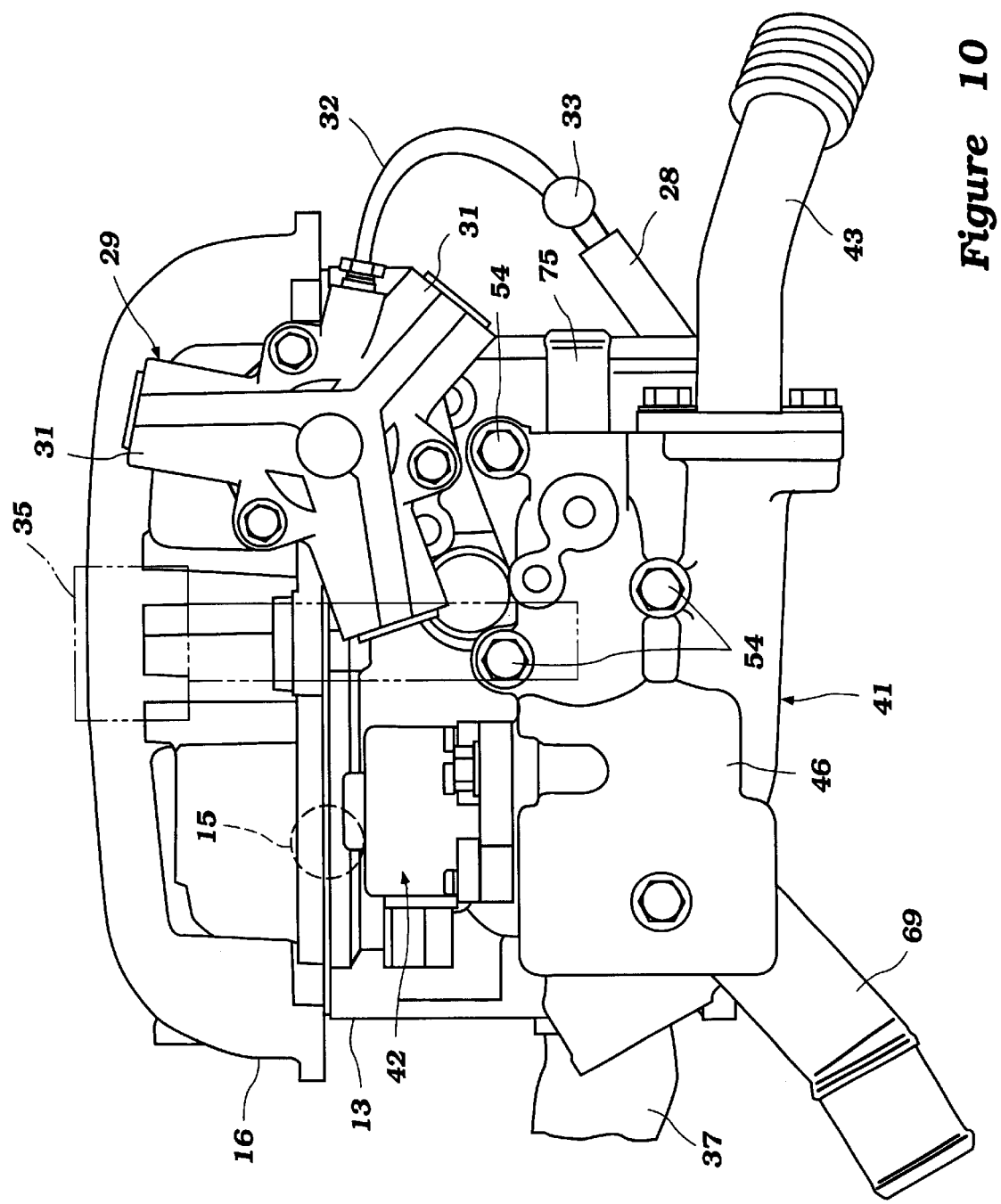
FIG. 10 is an end elevational view, in part similar to FIG. 5, showing another embodiment of the invention.

In the embodiment as thus far described, the high pressure fuel pump 29 has been positioned and driven by the exhaust cam shaft 15 and the EGR valve 41 has been disposed on the side where the intake cam shaft 14 is located. Of course, the components could be reversed and such a reversed arrangement is shown in FIG. 10.

This arrangement permits the high pressure fuel pump 29 to be located closer to the fuel injectors 28 and thus permits a somewhat shorter routing arrangement. In all other regards, this embodiment is the same as that previously described and therefore further description of the construction and operation of this embodiment is not believed to be necessary to permit those skilled in the art to practice the invention.

Of course, it should be readily apparent to those skilled in the art that the foregoing description is that of preferred embodiments of the invention. Various chambers and modifications may be made without departing from the spirit and scope of the invention, as defined by the appended claims.

What is claimed is:

1. An internal combustion engine having a liquid cooled engine body, an exhaust manifold for collecting exhaust gases from said engine body and discharging them to the atmosphere through an exhaust system, an induction system for inducting air into said engine body for mixture with fuel and combustion therein, said engine body cooling jacket being in fluid communication with a coolant source for delivering coolant to said engine body cooling jacket and receiving coolant to said coolant source, said fluid communication being provided at least in part by an external conduit which is formed in a unit with an exhaust gas recirculation valve so that the engine coolant flowing between said coolant source and said engine body cooling jacket will cool said exhaust gas re-circulation valve.

2. An internal combustion engine as set forth in claim 1 wherein the external conduit is comprised of a main body member defining an internal chamber in which the exhaust gas recirculation valve is contained, said exhaust gas recirculation valve being comprised of a valve plate having a flow opening controlled by an exhaust control valve element and further including a solenoid actuator mounted on said main body member for operating said exhaust control valve element.

3. An internal combustion engine as set forth in claim 2 wherein the main body member is formed with an exhaust gas inlet communicating with the exhaust manifold for delivering exhaust gasses to the exhaust gas recirculation valve and an exhaust gas discharge for delivering exhaust gasses from said exhaust gas recirculation valve to the induction system.

4. An internal combustion engine as set forth in claim 3 wherein the exhaust gas inlet of the main body member is located on the same side thereof as the coolant connection to the engine body coolant jacket.

5. An internal combustion engine as set forth in claim 3 wherein the exhaust gas outlet of the main body member is located on the same side thereof as the coolant outlet from said main body member.

6. An internal combustion engine as set forth in claim 5 wherein the exhaust gas inlet of the main body member is located on the same side thereof as the coolant connection to the engine body cooling jacket.

7. An internal combustion engine as set forth in claim 6 wherein the exhaust gas inlet of the main body member is vertically displaced in one direction from a coolant connection at one side of the main body member and the exhaust gas outlet of said main body member is vertically displaced in the opposite direction from a coolant connection at the other side of said main body member.

8. An internal combustion engine as set forth in claim 1 wherein the exhaust manifold is disposed at one side of said engine, the intake manifold is disposed at the other side of said engine and the main body member is disposed at the end of the engine.

9. An internal combustion engine as set forth in claim 8 further including a high pressure fuel pump located at said one end of said engine driven at one side of said engine.

10. An internal combustion engine as set forth in claim 9 wherein the external conduit is comprised of a main body member defining an internal chamber in which the exhaust gas recirculation valve is contained, said exhaust gas recirculation valve being comprised of a valve plate having a flow opening controlled by an exhaust control valve element and further including a solenoid actuator mounted on said main body member for operating said exhaust control valve element.

11. An internal combustion engine as set forth in claim 10 wherein the solenoid actuator and the exhaust gas recirculation valve are disposed at vertically spaced locations at the one end of the engine.

12. An internal combustion engine as set forth in claim 11 wherein the high pressure fuel pump is driven at the one side of said engine by a camshaft.

13. An internal combustion engine as set forth in claim 12 wherein the camshaft driving the high pressure fuel pump comprises an exhaust camshaft located on the exhaust manifold side of said engine.

14. An internal combustion engine as set forth in claim 12 wherein the camshaft driving the high pressure fuel pump comprises an intake camshaft located on the intake manifold side of said engine.

* * * * *